United States Patent [19]

Beier et al.

[11] Patent Number: 5,574,812

[45] Date of Patent: Nov. 12, 1996

[54] HOLDER ARRANGEMENT FOR OPTICAL CONNECTORS OR THE LIKE

[75] Inventors: Axel Beier; Hans-Dieter Weigel, both of Berlin, Germany

[73] Assignee: Siemens Aktiengesellscnaft, München, Germany

[21] Appl. No.: 495,669

[22] PCT Filed: Jan. 4, 1994

[86] PCT No.: PCT/DE94/00013

§ 371 Date: Jul. 26, 1995

§ 102(e) Date: Jul. 26, 1995

[87] PCT Pub. No.: WO94/17433

PCT Pub. Date: Aug. 4, 1994

[30] Foreign Application Priority Data

Jan. 26, 1993 [DE] Germany .................. 43 02 826.8

[51] Int. Cl.⁶ .................. G02B 6/00; G02B 6/36
[52] U.S. Cl. .................. 385/78; 385/147
[58] Field of Search .................. 385/76, 77, 78, 385/81, 85, 86, 87, 88, 147

[56] References Cited

U.S. PATENT DOCUMENTS

| 4,073,050 | 2/1978 | Kloots | 385/78 |
| 4,553,813 | 11/1985 | McNaughton | 250/227 |
| 4,953,929 | 9/1990 | Basista et al. | 385/78 |
| 5,071,219 | 12/1991 | Yurtin et al. | 385/78 |
| 5,073,046 | 12/1991 | Edwards et al. | 385/78 X |
| 5,140,663 | 8/1992 | Edwards et al. | 385/78 X |
| 5,214,732 | 5/1993 | Beard et al. | 385/78 |
| 5,253,316 | 10/1993 | Shibutani et al. | 385/78 |
| 5,325,455 | 6/1994 | Henson et al. | 385/78 |
| 5,398,295 | 3/1995 | Chang et al. | 385/78 X |

FOREIGN PATENT DOCUMENTS

| 0123590 | 4/1984 | European Pat. Off. . |
| 0375669 | 5/1985 | European Pat. Off. . |
| 0408852A3 | 5/1990 | European Pat. Off. . |
| 0567809A2 | 4/1993 | European Pat. Off. . |
| 91 02 805.1 | 3/1991 | Germany . |

*Primary Examiner*—Akm E. Ullah
*Attorney, Agent, or Firm*—Kenyon & Kenyon

[57] ABSTRACT

The holder has at least two receptacles which have holding devices on the inside of the receptacles, each for an individual optical connector housing. The receptacles are rigidly interconnected. At least one receptacle is larger on the inside, in at least one direction radial to the longitudinal axis of the housing, than the corresponding outside dimension of the housing. This is so that at least one housing is held so that is can be moved in the one radial direction (X).

21 Claims, 2 Drawing Sheets

HOLDER ARRANGEMENT FOR OPTICAL CONNECTORS OR THE LIKE

BACKGROUND OF THE INVENTION

The present invention concerns a holder having at least two receptacles which include holding means on the inside of the holder, where each receptacle is for an individual optical connector housing.

A holder consisting of two complementary parts is described in German Utility Model G 91 02 805.1. The holder has two receptacles consisting of a two-chamber interior, the interior of each chamber possesses a precisely configured profile which corresponds to the configuration of the defined outer profile of the respective connector housing. The connector housings are held securely in the holder so as to be immovable, and exhibit no radial mobility whatsoever with respect to one another or to the holder.

A holder of the aforesaid type having at least two receptacles, each for an individual optical connector housing, is described in European Patent EP-A2-0 408 852. Each receptacle has holding means located inside, in the form of four ramp-shaped elevations which interact with corresponding recesses in the outer surfaces of the connector housings. With this holder as well, the connector housings are held securely in the receptacles so as to be immovable. To allow relative radial movement of the connector housings with respect to one another, the receptacles are joined to one another by a resilient element. This allows a radial displacement of the connector housings according to the arrangement of corresponding coupling elements (for example complementarily configured connector housings or receptacles with electro-optical elements) during the coupling process. To guarantee sufficient radial mobility with sufficient overall rigidity (in terms of existing draft standards such as ANSI X3T9), this holder requires a relatively large space between the two receptacles. It is therefore problematical to hold connector housings with rectangular cross sections in a flat orientation, due to the spacings required by existing draft standards between connector housing longitudinal axes (or between connector pins held in the housings). Handling of this holder during insertion into corresponding coupling elements is problematical because to do so the holder must be grasped in the region of the resilient element, and the resilient element is thereby undesirably compressed and/or the relative radial mobility of the receptacles is impeded.

An object of the present invention therefore is to create a holder having a simple structural configuration with which individual connector housings can be joined, with relative radial mobility, to form a multiple connector, and which is extremely easy to handle during the insertion process.

SUMMARY OF THE INVENTION

This and other objects are achieved with the holder of the present invention. A holder as described above has receptacles that are substantially rigidly interconnected. At least the holding device of one receptacle and that receptacle are dimensioned on the inside (with respect to the corresponding outside dimension of the connector housing) in such a way that at least the connector housing held by that receptacle is movable in at least one direction that is radial with respect to the longitudinal axis of the connector housing. One essential advantage of the present invention is that the radial mobility of the connector housings relative to one another is made possible by the movable mounting in the receptacle or receptacles, so that the receptacles can be interconnected rigidly (i.e., without interposition of a resilient element). Because of the resulting simplified geometry of the holder, the tools required to manufacture the holder of the present invention are comparatively simple. A further advantage is the reduced space requirement of the holder of the present invention, which also guarantees sufficient radial mobility of connector housings with a rectangular cross section in a flat orientation. Movable mounting of the connector housing in the receptacle guarantees mobility of the connector housings even when the holder is being held and manually grasped (e.g. during insertion).

A development of the holder of the present invention that is particularly preferred in structural terms provides for the holding device to comprise at least one elevation and/or one recess that interact with corresponding recesses and/or elevations on the outer surface of the connector housing. Preferably, elevations arranged on the inside of the receptacles can engage in recesses that can easily be made in the outer surfaces of standard commercial simplex connector housings (e.g. the connector available from Nippon Telegraph and Telephone International Corp., Tokyo, Japan under the designation SC-01). The elevations are then smaller, at least in the one radial direction, than the corresponding recesses so as to allow mobility of the connector housing in the one radial direction.

The connector housings are particularly easy to introduce into the receptacles if the receptacles have a substantially C-shaped cross section, so that the respective connector housing can be introduced through the open side of the receptacles. The free arms of the C-shaped cross section are elastically deformable so that the connector housings—and, if applicable, fiber optic cables joined to them—can be easily introduced into and removed from the receptacles.

The connector housings can be introduced into the receptacles with particular ease and lack of susceptibility to damage when the elevations of the receptacles have an oblique surface facing the open side of the receptacles.

Radial movement of the connector housings toward the open side can be limited in a particularly structurally simple manner because at least one elevation of the receptacle has a stop surface, facing away from the open side, as a limiting surface of the corresponding recess.

In a further embodiment of the invention, particularly advantageous in structural terms, the receptacles are configured with approximate mirror symmetry about a common center web. Also, the center web constitutes a stop to limit the respective radial movement of the connector housings.

The relative mobility of the connector housing with respect to one another in a plane perpendicular to the longitudinal axes of the connector housings is advantageously increased because at least the one receptacle is larger in a further radial direction, by an amount matched to the height of the respective elevation, than the corresponding outside dimension of the connector housing.

To impart to the connector housings a mobility in the axial direction as well, an advantageous development of the present invention provides for the recesses to be larger, in the direction of the longitudinal axes of the connector housings, than the corresponding elevations.

The receptacles each preferably surround the connector housings only over a portion of the respective peripheral surface. The connector housings can include suitable connectors (e.g., connector pins) for coupling with complementary connectors. The connector housings can also be configured for coupling with optoelectronic components.

DETAILED DESCRIPTION

Figure 1:
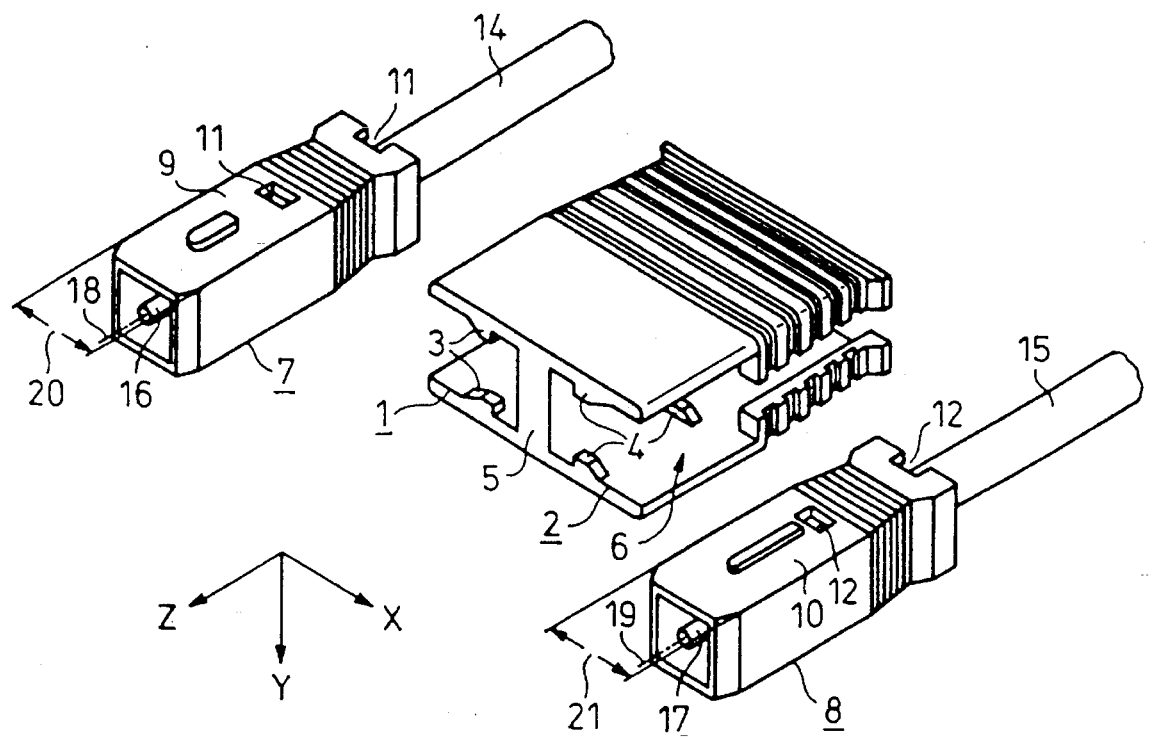
FIG. 1 is a schematic diagram of two individual connector housings before they are installed in a holder designed according to the present invention.

The holder shown in FIG. 1 comprises two receptacles 1, 2 that each have on their inside a plurality of elevations 3, 4. Receptacles 1, 2 have a substantially C-shaped cross section, each with one open side (FIG. 1 shows only the open side 6 of receptacle 2 in its entirety), and are rigidly interconnected in an approximately mirror-symmetrical arrangement by a common center web 5. An individual optical connector housing 7, 8 can be installed in each receptacle 1, 2. Elevations 3, 4 engage into recesses 11, 12 provided on outer surfaces 9, 10 of the housings 7, 8, which holds the housings 7, 8 and allows them to move in the receptacles as explained in more detail below. Fiber optic cables 14, 15, having at least one optical fiber guided therein, enter housings 7, 8 at the rear. The fiber optic cables 14, 15 have couplable end surfaces and end at the end surface of a connector pin 16, 17 (depicted in outline). The longitudinal axis of each connector pin 16, 17 coincides with the respective longitudinal housing axis 18, 19, the orientation of which is indicated as Z in FIG. 1. Orthogonal directions X and Y extend in a plane perpendicular to the Z direction that are also radial to the longitudinal housing axes 18, 19. Receptacles 1, 2 are, in at least one radial direction X, larger than the corresponding dimension 20, 21 of housings 8, 9. Elevations 3, 4 are, at least in radial direction X, smaller than the corresponding dimensions of the corresponding recesses 11, 12 in such a way that the housings 7, 8 are held so that they can move in at least the radial direction X.

Figure 2:
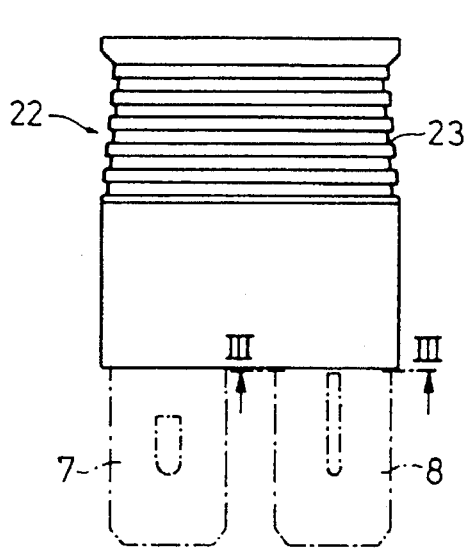
FIG. 2 is a plan view of the holder with connector housings (shown in outline)

As shown in FIG. 2 the holder only partially surrounds connector housings 7, 8 (depicted in outline) in a rear area 22. Additionally, the holder has gripping ribs 23 to facilitate handling.

Figure 3:
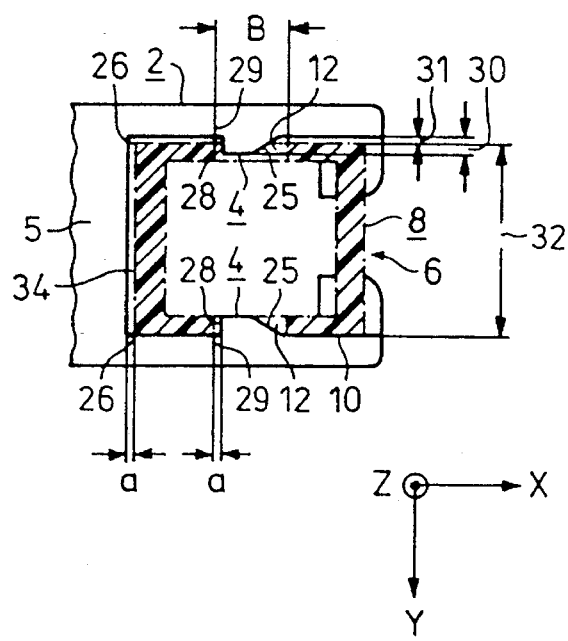
FIG. 3 is a partial section along line III—III in FIG. 2.

FIG. 3 shows a partial end view of the holder in an enlarged depiction as compared with FIG. 2, where connector housing 8 is shown in outline form and in section, in the region of the elevations 4. Elevations 4 each have a ramp 25, facing the open side 6 of a receptacle 2, which upon introduction of the housing 8 first comes into contact with edges 26 of the housing, causing the arms of receptacle 2 to move apart. When the housing 8 has been pushed into receptacle 2 to the point that recesses 12 on the outer housing surfaces 10 are located opposite elevations 4, the elevations snap into recesses 12 and retain housing 8 in receptacle 2. The elevations 4 have stop surfaces 28 facing away from the open side 6 of the receptacle 2, each of which interacts with a limiting surface 29 of the respective corresponding recess 12 and limits movement of the housing 8 toward this open side 6. The movement of housing 8 in the opposite orientation is limited by the common center web 5, which includes a stop surface for a lateral limiting surface 34 of the housing 8. The respective clearance a between the stop and limiting surfaces is selected, in the present example, as 0.5 mm in each case, so that the housing 8 can move a total of 1 mm in the radial direction X.

As FIG. 3 also shows, receptacle 2 is larger than the corresponding connector housing dimension 32, in the additional direction Y that is radial to the longitudinal housing axes 18, 19, by an amount 31 compared to the height 30 of elevation 4. This gives housing 8 greater mobility in the X-Y radial plane.

Figure 4:
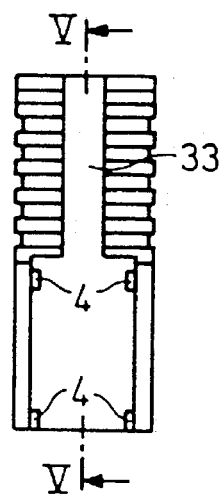
FIG. 4 is a side view of the holder.

FIG. 4 shows a side view of the holder and a continuous lateral slit through which the respective fiber optic cable 14 or 15 (see FIG. 1) can be inserted and removed.

Figure 5:
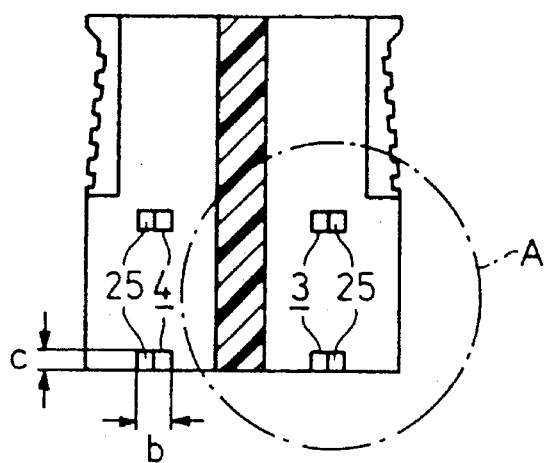
FIG. 5 is a section along line V—V in FIG. 4.

The section shown in FIG. 5, along line V—V in FIG. 4, illustrates the symmetrical arrangement of elevations 3, 4 in the upper region of the holder. As FIG. 4 indicates, a corresponding symmetrical arrangement is provided in the lower region. In this example, the width b of the elevations, including ramp 25, is 2.4 mm, and their axial extension c is 1.5 mm. The corresponding width B (see FIG. 3) of the corresponding recess, however, is 2.9 mm.

Figure 6:
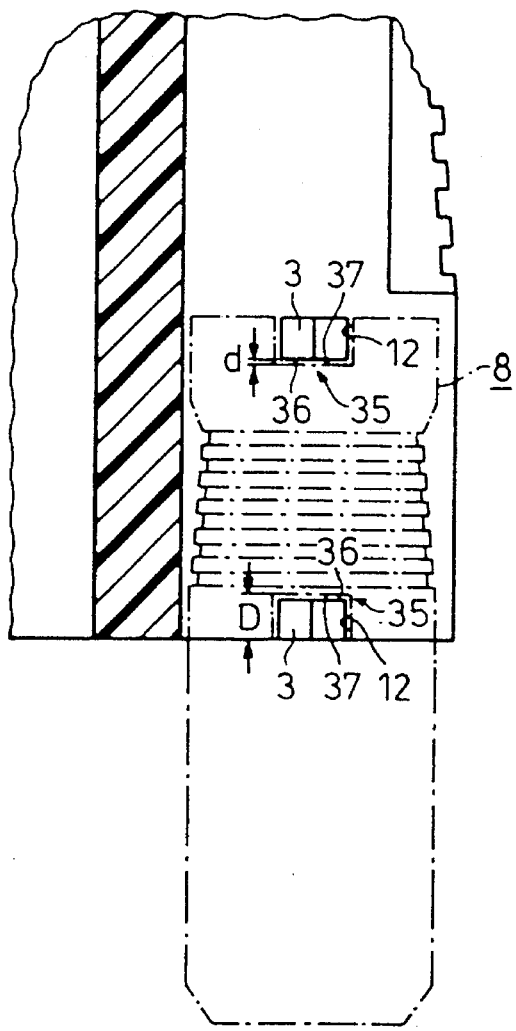
FIG. 6 is an enlargement of a portion of FIG. 5.

To illustrate further the position of connector housing 8 (depicted with dot-dash lines) and its mobility in radial direction X (see FIG. 1), FIG. 6 shows an enlarged view of region A of the holder shown in FIG. 5. In each region 35 of the corresponding radial surfaces 36 of elevations 3 with corresponding surfaces 37 of housing 8 there is a gap d of 0.1 mm (based on the corresponding axial length D of recess 12 of 1.6 mm), so that preferably a slight mobility is also permitted in axial direction Z (FIG. 1), making jamming in the Z-X plane less likely during insertion.

The holder according to the invention is of robust and structurally very simple design, and is easy to handle during the connection process; handling does not impair the mobility of the connector housings. Although relative mobility of the connector housings with respect to one another is achieved by movable mounting of one of the connector housings, mobility of both or (if more than two connector housings are present) all the connector housings is particularly advantageous in order to meet existing standards or draft standards (e.g. ANSI X3T9).

We claim:

1. A connector arrangement comprising:

at least two individual optical connector housings; and a holder having at least two receptacles, said receptacles being substantially rigidly interconnected, each of said receptacles has a substantially C-shaped cross section with two arms, each of said receptacles being capable of receiving one of said connector housings, each of said receptacles includes a holding device on an inside surface of each of said receptacles, each holding device interacts with a complementary holding device of said connector housings;

wherein the inside surface of at least one of said receptacles and the holding device of said at least one receptacle is dimensioned with respect to an outside dimension of at least one of said connector housings and the complementary holding device of said at least one connector housing such that said at least one connector housing is capable of movement in at least one direction that is radial to a longitudinal axis of said at least one connector housing; and wherein the arms of the C-shaped cross section of each of said receptacles is elastically deformable such that upon introduction of the connector housings into said receptacles, said arms expand flexibly, and when the connector housing is fully introduced into said receptacles, the arms contract flexibly, so that the holding devices of said receptacles mutually interact with the complementary holding devices of the connector housings.

2. Connector arrangement of claim 1, wherein the holding device of at least one of the receptacles includes at least one elevation that interacts with a corresponding recess on an outer surface of one of the connector housings.

3. Connector arrangement of claim 1, wherein the holding device of at least one of the receptacles includes at least one recess that interacts with a corresponding elevation on an outer surface of one of the connector housings.

4. Connector arrangement of claim 2, wherein each elevation of said receptacles includes an oblique surface facing an open side of said receptacles.

5. Connector arrangement of claim 2, wherein at least one elevation of the receptacle includes a stop surface facing away from an open side of said receptacle, such that said stop surface of said receptacle limits movement of the elevation in one of said recesses.

6. Connector arrangement of claim 4, wherein at least one elevation of the receptacle includes a stop surface facing away from the open side of said receptacle, such that said stop surface of said receptacle limits movement of the elevation in one of said recesses.

7. Connector arrangement of claim 1, wherein the receptacles of said holder are configured approximately in mirror symmetry about a common center web such that the center web limits radial movement of the connector housings.

8. Connector arrangement of claim 2, wherein the receptacles of said holder are configured approximately in mirror symmetry about a common center web such that the center web limits radial movement of the connector housings.

9. Connector arrangement of claim 3, wherein the receptacles of said holder are configured approximately in mirror symmetry about a common center web such that the center web limits radial movement of the connector housings.

10. Connector arrangement of claim 4, wherein the receptacles of said holder are configured approximately in mirror symmetry about a common center web such that the center web limits radial movement of the connector housings.

11. Connector arrangement of claim 5, wherein the receptacles of said holder are configured approximately in mirror symmetry about a common center web such that the center web limits radial movement of the connector housings.

12. Connector arrangement of claim 6, wherein the receptacles of said holder are configured approximately in mirror symmetry about a common center web such that the center web limits radial movement of the connector housings.

13. Connector arrangement of claim 2, wherein at least one of the receptacles is larger in an additional radial direction than a height of the elevation in said receptacle and a corresponding outside dimension of the connector housing.

14. Connector arrangement of claim 4, wherein at least one of the receptacles is larger in an additional radial direction than a height of the elevation in said receptacle and a corresponding outside dimension of the connector housing.

15. Connector arrangement of claim 6, wherein at least one of the receptacles is larger in an additional radial direction than a height of the elevation in said receptacle and a corresponding outside dimension of the connector housing.

16. Connector arrangement of claims 7, wherein at least one of the receptacles is larger in an additional radial direction than a height of the elevation in said receptacle and a corresponding outside dimension of the connector housing.

17. Connector arrangement of claim 2 wherein the recesses in said connector housings are larger, in a direction of the longitudinal axes of the connector housings, than the corresponding elevations in said receptacles.

18. Connector arrangement of claim 4 wherein the recesses in said connector housings are larger, in a direction of the longitudinal axes of the connector housings, than the corresponding elevations in said receptacles.

19. Connector arrangement of claim 6 wherein the recesses in said connector housings are larger, in a direction of the longitudinal axes of the connector housings, than the corresponding elevations in said receptacles.

20. Connector arrangement of claim 7 wherein the recesses in said connector housings are larger, in a direction of the longitudinal axes of the connector housings, than the corresponding elevations in said receptacles.

21. Connector arrangement of claim 13 wherein the recesses in said connector housings are larger, in a direction of the longitudinal axes of the connector housings, than the corresponding elevations in said receptacles.

* * * * *